United States Patent [19]

Hughes et al.

[11] 4,217,571
[45] Aug. 12, 1980

[54] STUTTER SEISMIC SOURCE

[75] Inventors: Donald R. Hughes, Houston, Tex.;
William H. Gumma, Lakewood, Colo.; Neil S. Zimmerman, New Orleans, La.

[73] Assignee: Standard Oil Company (Indiana), Chicago, Ill.

[21] Appl. No.: 878,214

[22] Filed: Feb. 16, 1978

[51] Int. Cl.² ............................ G01V 1/00; G01V 1/04
[52] U.S. Cl. ...................................... 367/37; 181/106; 181/116; 181/118; 181/120
[58] Field of Search ............... 181/106, 116, 118, 120; 102/21.6; 340/15.5 TC

[56] References Cited

U.S. PATENT DOCUMENTS

| | | | |
|---|---|---|---|
| 2,064,451 | 12/1936 | Voorhees | 340/15.5 R |
| 2,320,248 | 5/1943 | Shimek | 340/15.5 TA |
| 2,377,903 | 6/1945 | Rieber | 340/15.5 GC |
| 2,779,428 | 1/1957 | Silverman | 340/15.5 CC |
| 3,050,148 | 8/1962 | Lee | 102/21.6 |
| 3,087,424 | 4/1963 | Levin | 102/21.6 |
| 3,437,170 | 4/1969 | Brock et al. | 181/120 |

FOREIGN PATENT DOCUMENTS 680132  2/1964  Canada ................................ 102/21.6

OTHER PUBLICATIONS

L. D. Jaffe, *Oil and Gas Journal*, 15 Aug. 1977, pp. 92-97.

Primary Examiner—S. C. Buczinski
Attorney, Agent, or Firm—Arthur McIlroy

[57] ABSTRACT

An improved seismic prospecting system comprising the use of a closely spaced sequence of source initiations at essentially the same location to provide shorter objective-level wavelets than are obtainable with a single pulse. In a preferred form, three dynamite charges are detonated in the same or three closely spaced shot holes to generate a downward traveling wavelet having increased high frequency content and reduced content at a peak frequency determined by initial testing.

20 Claims, 11 Drawing Figures

STUTTER SEISMIC SOURCE

BACKGROUND OF THE INVENTION

This invention relates to the field of seismic geophysical exploration and more particularly to an improved source of acoustic waves for seismic exploration.

Seismic geophysical exploration in general involves the generation of acoustic waves at or near the earth's surface and the recording at the earth's surface of acoustic waves reflected from subsurface interfaces. Originally, the acoustic wave source was simply a dynamite charge in a shallow shot hole. A newer alternative to the dynamite or impulsive source is the mechanical or hydraulic vibrator which is used to generate a swept frequency signal at the earth's surface. When such swept frequency vibratory signals are used, the reflected signals detected at the earth's surface are correlated with a pilot signal which corresponds to the signal initially generated. After the correlation procedure, such received signals appear to be essentially the same as the reflected signals obtained when an impulsive source is used.

A number of U.S. patents, thought to be relevant to the present application, include U.S. Pat. No. 2,064,451, issued to Voorhees; U.S. Pat. No. 2,320,248, issued to Shimeck; U.S. Pat. No. 2,377,903, issued to Rieber; and U.S. Pat. No. 2,779,428, issued to Silverman.

The first three of these patents deal with the use of multiple impulsive sources in efforts to emphasize certain seismic frequencies, and, in some cases, to provide directional responses. For example, the Voorhees patent involves the use of a number of individual charges spaced vertically apart in a shot hole and fired simultaneously. As stated in that patent, the result is a sustained seismic wave having a single or predominating wavelength and frequency and traveling in a generally downward direction. The resulting wave is in essence a monofrequency burst having a considerable overall length in time and space which reduces its effectiveness at defining thin strata.

The Shimeck patent involves the use of multiple charges fired at essentially the same point in a shot hole but time-spaced. The resulting downward traveling wave is essentially identical to that of Voorhees except that the emphasized frequency is a function of the time spacing of the shot firings instead of the physical spacing in the shot hole. Again Shimeck produces in essence a long monofrequency burst and he suggests detecting it with finely tuned amplifiers and requires integration of the detected signals.

The Reiber patent differs from Shimeck in having the individual charges spaced laterally from each other to some extent. As a result, the effective wavetrain frequency varies with the angle of propagation from the charge array. In this way, the array is said to provide directional response. Again, the time-spaced firings generate a fairly long monofrequency wavetrain and tuned amplifiers are suggested for detecting the return signals.

Each of these three patents, therefore, involves the use of impulsive sources to emphasize a single frequency of seismic energy but does so at the cost of generating a monofrequency wave train of long time duration. As a result, these types of signals cannot be used to distinguish interfaces which are close together, such as the top and bottom of a thin hydrocarbon-bearing sand. In other words, seismograms produced from the signals used in these patents would display poor resolution.

The Silverman patent referenced above involves the use of multiple charges fired at a nonrepetitive time-spacing sequence. The received signals are in effect correlated with a time sequence representing the firing schedule of the individual charges. In this way, the composite long time interval wavelet is compressed into a short spike in the same method of operation as swept frequency systems which employ vibrators. The Silverman system, therefore, does not lose resolution by using multiple time-spaced charges but does require the use of correlation processing equipment.

Thus, it is seen that it has been known that particular frequencies can be emphasized by multiple firing of individual impulsive sources, and it has been known that impulsive sources can be used in fairly high resolution systems using correlation techniques, but a method of firing multiple charges to give selective frequency emphasis has not been described which could be employed in high resolution seismic prospecting without the use of a correlation process.

Accordingly, an object of the present invention is to provide a method for high resolution seismic prospecting using multiple impulsive sources without requiring correlation of received signals.

According to the present invention, a seismic initiation is generated by means of a closely spaced time sequence of simple source pulses having amplitudes and time spacing selected by initially measuring the response of the earth transmission system to a single pulse. Resulting recorded signals reflected from subsurface interfaces contain a relatively broad and flat spectrum of frequencies.

BRIEF DESCRIPTION OF THE DRAWINGS

The present invention may be more fully understood by reading the following description of the preferred embodiment with reference to the attached drawings wherein.

DESCRIPTION OF THE PREFERRED EMBODIMENT

As noted in the statement of the prior art, there have been previous attempts to improve seismic signals by use of multiple impulses spread over time, but these have necessarily resulted in a transmitted wavelet having a longer time duration. This wavelet was also of essentially a single frequency and the reflections of the wavelet received back at the earth's surface were therefore of long time duration. As a result, such wavelets have not been useful in the resolution of closely spaced interfaces.

It has previously been assumed that to define such thin rock intervals the shortest transmitted wavelet possible must be used since only a short reflected wavelet can resolve a thin interval. We have discovered to the contrary that it is possible to use multiple times-paced impulses combined into a single wavelet as the seismic initiation in high resolution seismic prospecting. The reason this is possible is that we have taken into account the natural filtering response of the earth and designed a seismic initiation which, when reflected from subsurface interfaces back to the earth's surface and thereby filtered by the earth, will result in a wavelet whose major excursions are concentrated near its center. The result is higher resolution in seismic prospecting.

Figure 1:
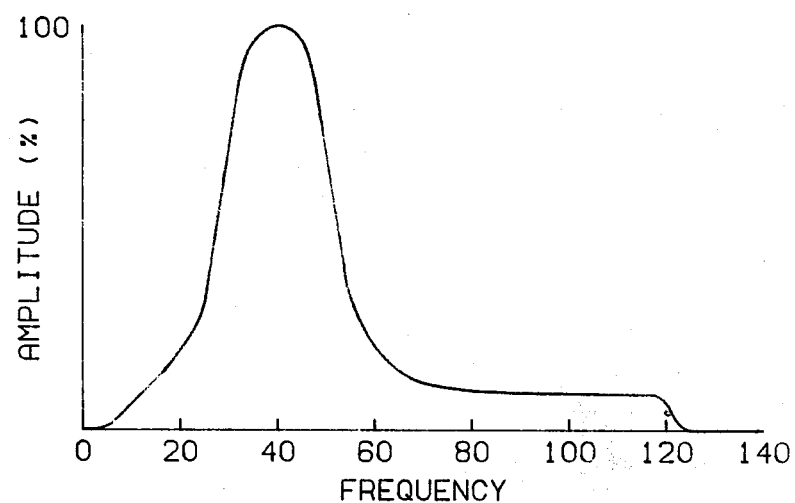
FIG. 1 represents a typical amplitude spectrum of a seismic wavelet reflected from a subsurface interface.

FIG. 1 illustrates a representative amplitude spectrum of reflected signals which are typically received in standard impulsive type prospecting; that is, this amplitude spectrum corresponds to the signal received when a single impulsive source is used as the seismic initiation. A single impulse, such as a dynamite charge, generates a broad spectrum of frequencies which are transmitted into the earth. The earth selectively attenuates these frequencies and, in a typical case as illustrated in FIG. 1, passes most easily a signal at, for example, 40 to 41 Hz. This is, of course, only one example, and the actual peak frequency of transmission will vary from one location on the earth to another, but, in general, there will be a narrow peak such as illustrated in FIG. 1. The plot of FIG. 1 is of relative amplitude versus frequency.

Figure 2:
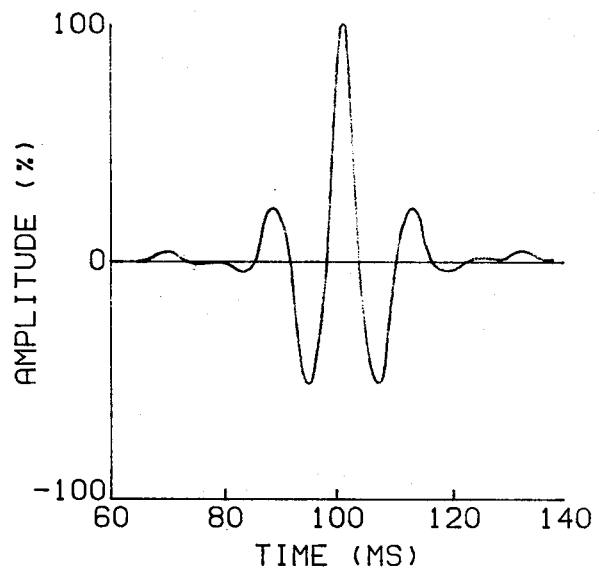
FIG. 2 is a time plot of the zero phase wavelet having the spectrum illustrated in FIG. 1.

FIG. 2 is a plot of amplitude versus time of a wavelet which has the amplitude spectrum illustrated in FIG. 1. These signals are, of course, mathematically derived because in practice it is very difficult or essentially impossible to identify a single complete wavelet due to interference effects brought on by the fact that isolated interfaces are rare. The wavelet illustrated in FIG. 2 may be identified as a zero phase wavelet due to its symmetrical nature and the concentration of energy at its center.

Figure 3:
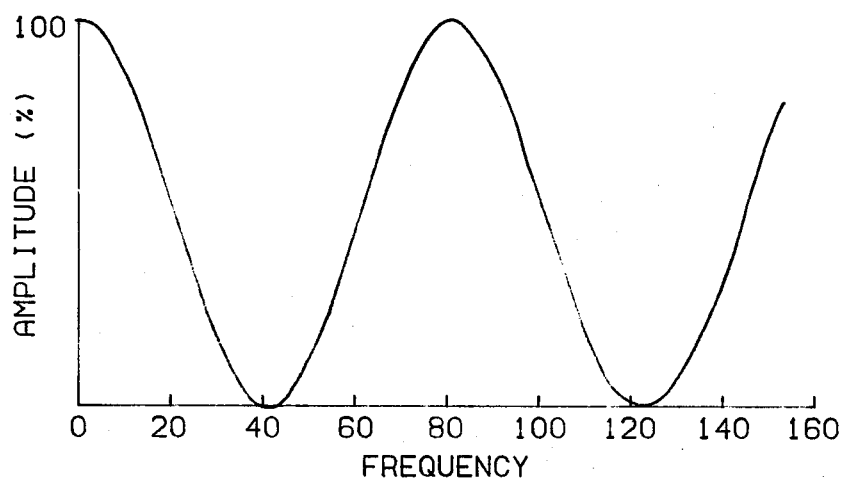
FIG. 3 illustrates the amplitude spectrum of a seismic initiation selected according to the present invention based on the spectrum of FIG. 1.

FIG. 3 illustrates the amplitude spectrum of a 3-impulse seismic initiation in which the amplitude of the first and third impulses is half that of the second and in which a 12 ms delay occurs between each impulse. The 12 ms delay was selected to provide a null at approximately 41 Hz on the frequency scale. The frequency at this first null is equal to the inverse of twice the delay time. The 41 Hz is taken from the peak of the amplitude spectrum of FIG. 1. Due to its symmetrical nature and central maximum, the 3-impulse initiation as described is itself a zero-phase operator and so generates a zero phase wavelet. The amplitude spectrum of a reflected signal from a subsurface interface using such a 3-impulse initiation can be determined by multiplying the spectrum of FIG. 1 with that of FIG. 3.

Figure 4:
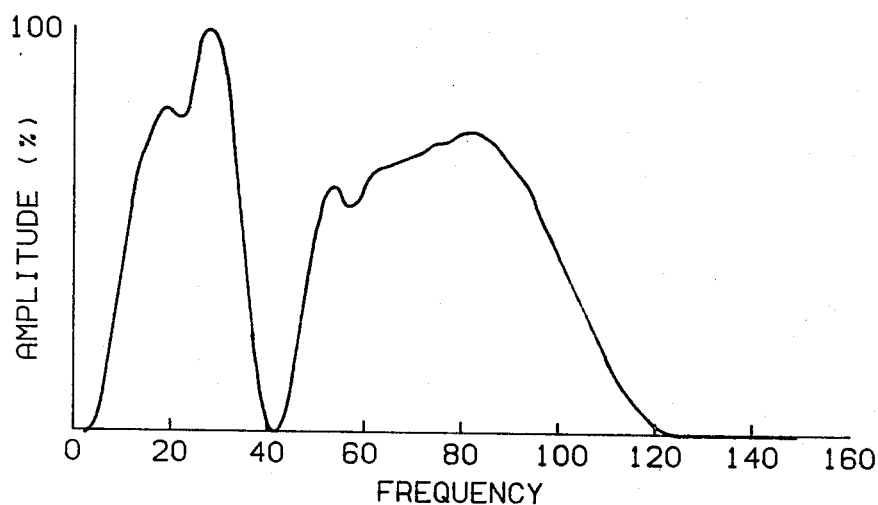
FIG. 4 is an amplitude spectrum of a wavelet according to the present invention reflected from the subsurface interface.
Figure 5:
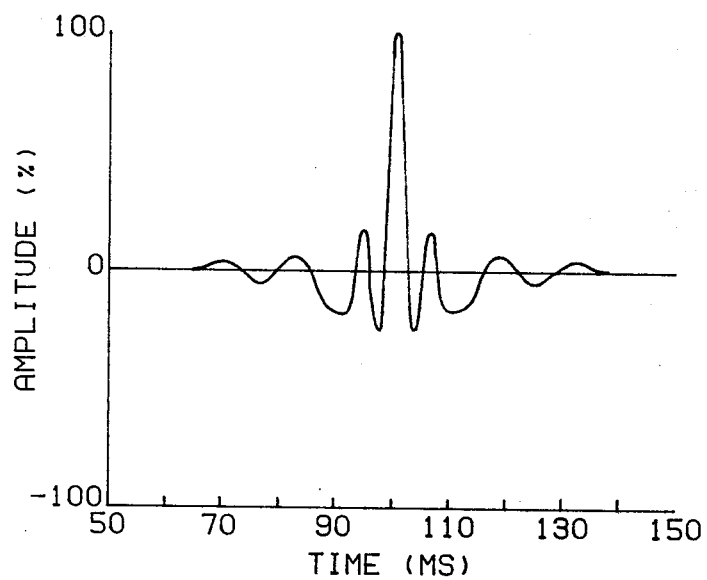
FIG. 5 illustrates the reflected wavelet according to the present invention.

FIG. 4 illustrates the product of FIGS. 1 and 3. While the spectrum illustrated in FIG. 4 is not ideally flat, it is much flatter or broader than the spectrum of FIG. 1. Such a broader spectrum corresponds to a narrower wavelet. FIG. 5 illustrates the zero phase wavelet having the amplitude spectrum of FIG. 4. A comparison of the wavelets of FIGS. 5 and 2 shows that the total time length of the wavelet of FIG. 5 is slightly longer than that of FIG. 2. A more detailed comparison also shows that the ratio of the amplitude of the central peak of the wavelet of FIG. 5 to any of the side lobes is much greater than the corresponding ratio in FIG. 2; thus, while the wavelet of FIG. 5 has more side lobes, they are much smaller than the side lobes of FIG. 2. Since resolution depends on the compactness of the wavelet, which is influenced by peak to side-lobe ratio, the wavelet of FIG. 5 would give better resolution than that of FIG. 2.

Thus, as illustrated by FIGS. 1 through 5, we have found that we can broaden the amplitude spectrum of recorded wavelets by use of an initiation having a minimum of its frequency spectrum content at the peak of the response of the earth to a single pulse in a given area. Such an initiation will de-emphasize the transmitted energy at said peak transmission frequency to provide a flattening or broadening of the amplitude spectrum of the detected signals which necessarily provides better concentration of energy in the detected wavelets and therefore higher resolution.

Figure 6:
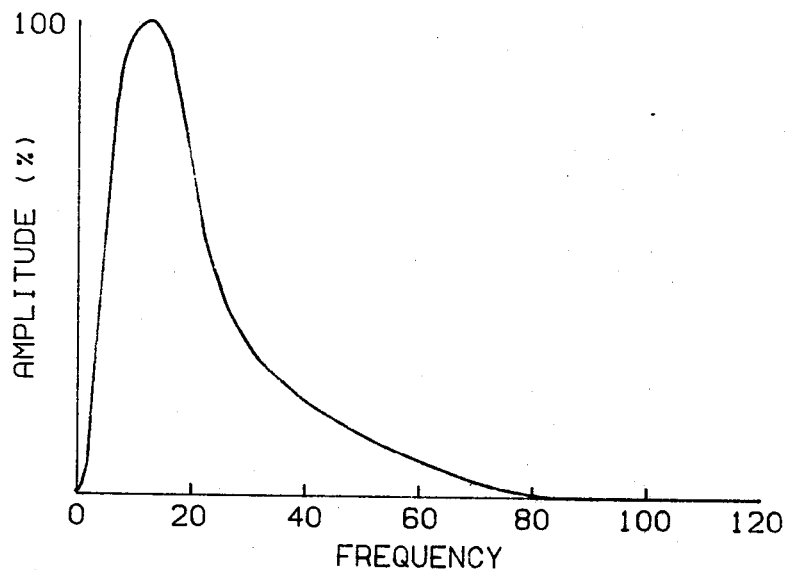
FIG. 6 illustrates an amplitude spectrum of a second type of objective depth wavelet.
Figure 7:
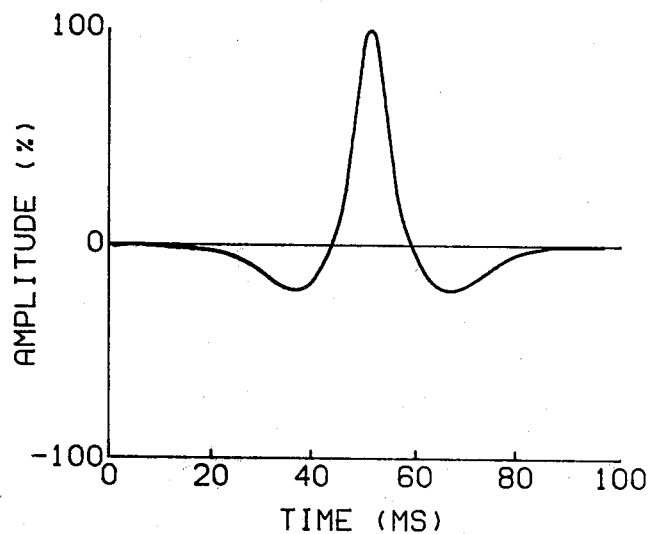
FIG. 7 is a time plot of the zero phase wavelet having the spectrum of FIG. 6.
Figure 8:
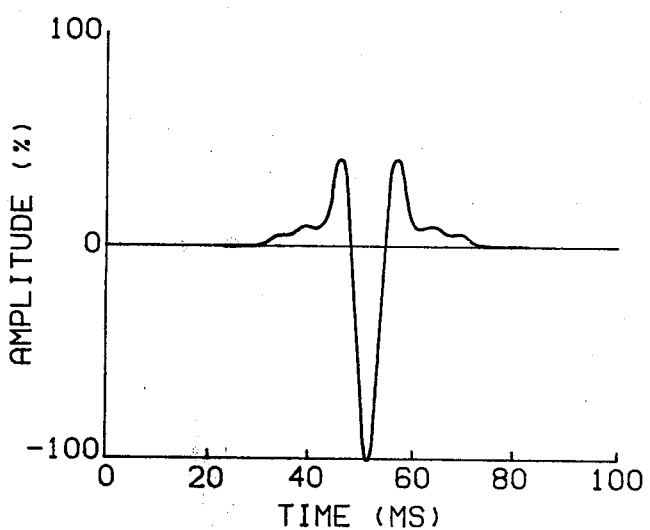
FIG. 8 is a time plot of a wavelet according to the present invention after reflection from a subsurface interface.
Figure 9:
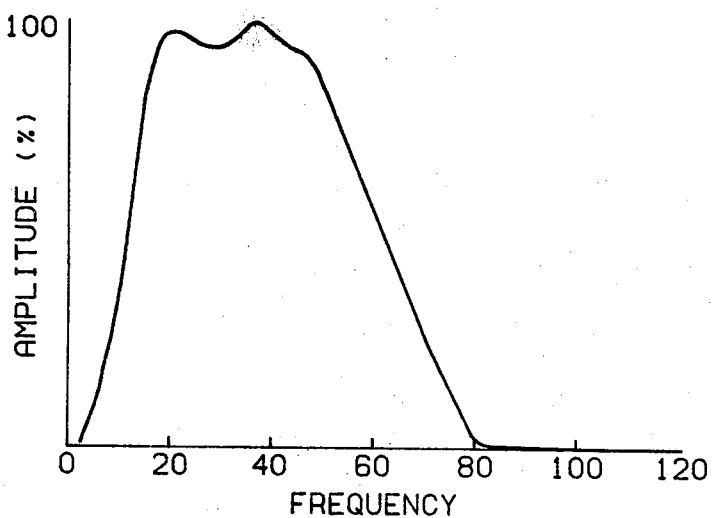
FIG. 9 illustrates the amplitude spectrum of the wavelet of FIG. 8.

An alternate form of initiation in which the second impulse has the opposite polarity of the first and third has also been found useful for certain cases. This occurs in particular when the natural passband of of the earth's transmission system has a very low peak frequency. FIG. 6 illustrates such a possible situation in which the peak transmission frequency occurs at about 13 Hz. An attempt to compensate for this peak by means of an initiation with the sort of frequency response illustrated in FIG. 3 would cause problems because several nulls would occur within the frequency band of interest. By inverting the polarity of the center impulse of the 3-impulse initiation, the same type of amplitude spectrum shown in FIG. 3 is achieved except that it is shifted so that a null occurs at zero Hz. The next null then occurs at a frequency corresponding to the inverse of the time interval between the individual impulses. An inspection of FIG. 6 indicates that a good place to maximize the frequency response would be at 80 Hz which corresponds to the end of the reflected amplitude spectrum from a single pulse; therefore, the time delays were selected at 6 ms to place the first null at about 160 Hz. The peak of the three-spike operator is therefore at about 80 Hz and it has a low frequency content in the 13 Hz region accentuated by the earth's transmission system. The composite amplitude spectrum is illustrated in FIG. 9 and the corresponding 180° wavelet which will result is illustrated in FIG. 8. A comparison of the wavelet of FIG. 8 to the original wavelet of FIG. 7 again shows a majority of the major excursions in the FIG. 8 wavelet occur in a shorter time span than those of the FIG. 7 wavelet. As a result, the wavelet of FIG. 8 would provide a higher resolution representation of subsurface interfaces.

In practice, it is difficult to obtain a mixture of positive and negative impulses which would require both implosive and explosive source elements. For this reason, the 3-impulse source using positive impulses is preferred, but negative impulses may be obtained by several methods. One of these is to use the negative ghost of a positive impulse. Another method is to use vibrators as the sources of the individual signals making up a 3-step initiation according to the present invention. It is apparent that although the present invention has been described in terms of actual explosive sources, such as dynamite, such sources could be replaced by vibrators using swept frequency signals with one or more such vibrators used in place of each explosive charge. The proper amplitude ratio could be maintained by using one vibrator for each of the first and third spikes and two for the second. When this is done, it is a simple matter to shift the phase of the signal swept by vibrators used for the second spike 180° and it becomes in effect the inverse of the signal swept by the other vibrators. In such a case, correlation with an operator created by superposition of these nonsimultaneous sweeps is necessary to compress the signals transmitted by each of the vibrators. After such correlation, the resulting earth spikes trace is essentially the same as if three actual impulsive sources had been used as taught by the present invention.

In the case of a very low passband such as shown in FIG. 6, it is not always absolutely essential to use a source having a negative impulse. The three positive impulse sources may also be used without setting the null at exactly the peak single impulse frequency. Instead, the time delays are selected to set the null of the source somewhat higher than the peak single impulse frequency. The result is a better overall balance in the amplitude spectrum and therefore a more compact received wavelet.

The first embodiment described above was tested in a Gulf of Mexico marine survey using water gun impulsive sources. The standard (non-stutter) source comprised a number of individual water guns fired simultaneously. The stutter source was achieved by firing one-fourth, one-half, and then one-fourth of the water guns in sequence with time spacings of 9 milliseconds. Two surveys essentially identical except for source stuttering were run in the High Island area of offshore Texas. The water guns were towed at a depth of 10 feet in both cases.

Figure 10:
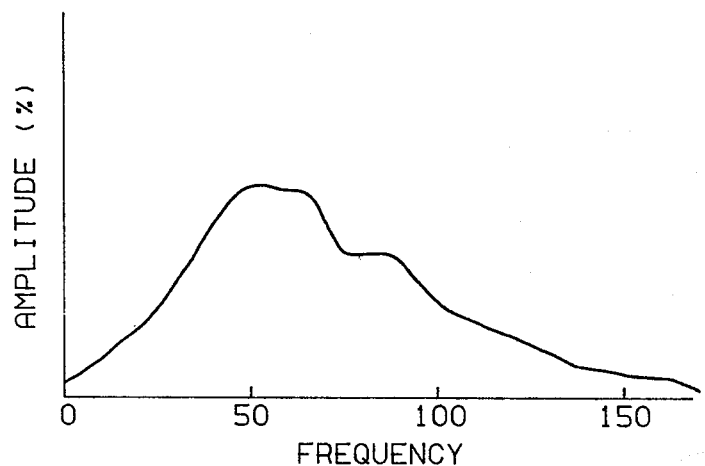
FIG. 10 illustrates an actual amplitude spectrum of objective depth wavelets using a single impulse source.

FIG. 10 illustrates the amplitude spectrum of the survey using simultaneously fired impulsive sources. This spectrum has a peak of 50 to 55 Hertz and drops off above and below this region. This spectrum was taken from returns occurring during the time interval of 750 to 1250 ms after the initiation.

Figure 11:
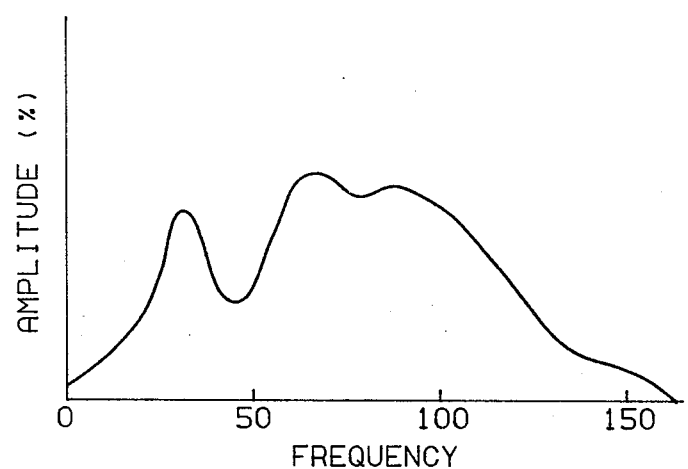
FIG. 11 illustrates an actual amplitude spectrum of objective depth wavelets in the same area as that of FIG. 10 but using a multiple impulse source according to the present invention.

FIG. 11 illustrates the amplitude spectrum of the survey using the above-described three impulses having a one-two-one amplitude ratio and 9 ms time spacings. Returns from the 750 to 1250 ms interval were also used to generate this spectrum. Based on the inverse of twice the time delay formula, this stutter source should have a null at about 55 Hz and a peak near 110 Hz. FIG. 11 shows a null near 45 Hz and greatly reduced response at 55 Hz. The response near 110 Hz is improved. Thus, FIG. 11 shows that the sequential source of the present invention does improve the amplitude spectrum of objective depth wavelets. Seismic sections prepared from data from the two runs also show that more high frequency content and greater subsurface detail result from use of the stutter source.

It is apparent that the peak earth transmission frequency varies with the depth of reflections. Those from deeper reflections have lower frequency peaks. Therefore, for best results, the returns from a single impulse source should be analyzed for the depth range of greatest interest to allow selection of the optimum time delays appropriate for that depth. This is the reason FIGS. 10 and 11 are based on only a portion of the total recorded reflection time.

A simple method of finding the single impulse peak transmission frequency involves the use of commercially available spectrum analyzers. For example, the Nicolet Scientific Corporation of Northvale, New Jersey, manufactures a suitable device under the designation Model 444 Mini-Ubiquitous FFT Computing Spectrum Analyzer. A prospect area may be tested by firing a single impulse source, such as dynamite, and detecting returns by means of a seismometer group. The detected returns may be coupled directly, or after recording, to the input of such a spectrum analyzer. The analyzer provides a visual display of the amplitude spectrum of the signal which was coupled to it. Such a procedure is preferred for field use since such spectrum analyzers may be transported to a field location and provide almost instant results. As an alternative, degitized and recorded returns may be taken to a general purpose computer and analyzed by programs written for such purposes.

In the above example, the impulsive sources were water guns, a commonly used source in marine conveys. Similar tests have been performed in dry land surveying using multiple explosive charges. In these tests, the charges were placed at essentially the same depth in three closely spaced shot holes. The holes were spaced about 10 feet apart to avoid detonation of the second and third charges by the first charge. Charges of commercial explosive weighing 5, 25, and 5 pounds were fired in that order. These charge weights were selected with the intent of providing a 1:2:1 signal amplitude ratio after the nonlinear relationship between charge weight and signal amplitude is considered. Another alternative is described in the publication, entitled "Aerospace Technology Can Be Applied to Exploration 'Back on Earth,'" *The Oil & Gas Journal,* Aug. 15, 1977, p. 92–97. The charge arrangement described in that publication should allow practice of the present invention in a single shot hole.

The above description and examples all involve the use of a three-impulse sequence having a one-two-one amplitude ratio. Another useful source consists of two same polarity impulses of equal weight with the time spacing selected according to the rule that the first null of the amplitude spectrum occurs at a frequency equal to the inverse of twice the delay time. The amplitude spectrum of a two-impulse source differs from FIG. 3 only by having amplitude values equal to the square root of those shown in FIG. 3. Another way of stating the difference is that the nulls are not as narrow. This can also be understood by the fact that the amplitude spectrum of the three-shot sequence is the product of the spectra of two two-shot sequences. The spectrum of a four-shot sequence may likewise be determined by multiplying the spectrum of a three-shot sequence by the spectrum of a two-shot sequence, and so on.

The two-shot sequence is obviously easier to produce but it lacks the desirable phase characteristics of the three-shot sequence. In particular, the three-shot sequences described are both essentially zero phase operators as far as resolution is concerned. As a result, the three-spike sequence does not change the phase spectrum from that which is received when a single spike is used. The two-shot sequence is not zero phase and does add some phase shift to the response of a single impulse. This added phase is known and can be removed by later processing if desired. The three-shot sequence is normally preferred because it avoids the need for an extra processing step.

The one-two-one amplitude ratio of the individual impulses is also not essential to practice of the present invention. In terms of relative amplitude of the peaks to the nulls in FIG. 3, the greatest attenuation is achieved with the one-two-one sequence. The depth of the nulls may be reduced by either decreasing or increasing the amplitude of the second impulse, but a decrease of the second impulse also causes undesired phase shifts in frequencies near the nulls. As a result, if less than the maximum attenuation level is desired, it is preferred to increase the amplitude of the second pulse. Calculations indicate that where the 1:2:1 ratio would provide about 50 db of practical attenuation, a 1:2.6:1 ratio would provide about 18 db attenuation, and a 1:10:1 would provide only about 4 db attenuation. Thus, for field use, ratios in the range 1:2:1 to 1:3:1 may be used practically and will provide a good range of attenuation levels. FIG. 4 illustrates a theoretical case where use of a ratio other than 1:2:1 may have been beneficial. The spectrum of FIG. 4 might be improved if the null at 41 Hz were not so deep. The depth of this null could be reduced by increasing the amplitude of the second pulse to a ratio of, for example 1:2.2:1.

While the above descriptions and examples are based on the assumption of a zero phase objective depth wavelet from a single impulse source, this will not necessarily occur. Just as an amplitude spectrum can be generated from returns when a single impulse source is used, a corresponding phase spectrum may also be generated. Then the knowledge of the phase spectrum may be used to design an initiation which has a compensating phase spectrum. The phase spectrum of the initiation spike sequence when added to that of the objective depth wavelet resulting from a single impulse should ideally result in a combined zero phase spectrum in order to give maximum resolution. Thus, it is apparent that the stutter source may be used to generate wavelets with zero phase spectra as well as ones with broad flat amplitude spectra.

While it is seen to be possible to sometimes improve the phase spectrum of the objective depth wavelet, the preferred three-shot source is designed to merely leave the wavelet phase spectrum unchanged. The preferred sequence improves the amplitude spectrum and thereby achieves a primary goal of overcoming dynamic range limitations in the recording system. By balancing high amplitude peaks in the amplitude spectrum, the recording system is able to record higher quality signals across a broader range of frequencies. While additional phase shift can be compensated for by later processing, signal frequencies lost due to dynamic range limitations cannot be recovered. This is why amplitude spectrum improvement by itself is considered especially important.

While the present invention has been illustrated in terms of particular methods and apparatus, it is clear that other changes and modifications may be made within the scope of the present invention as defined by the appended claims.

We claim:

1. A method of seismic prospecting for overcoming dynamic range limitations of seismic signal recording systems, thereby allowing such systems to record higher quality signals across a broader range of frequencies, comprising the steps of:

determining a peak impulsive transmission frequency of the earth, generating two or more time-spaced seismic initiations near the surface of the earth, wherein the time spacing is picked in accordance with the frequency spectrum location of said earth peak transmission frequency to de-emphasize the transmitted energy at said peak transmission frequency so as to broaden and flatten the amplitude versus frequency spectrum of the seismic signal to be received, and recording reflections of said initiations from subsurface interfaces for a period of time after said initiation.

2. A method according to claim 1 further including the step of generating a visual display from the recorded reflections.

3. A method of seismic prospecting for overcoming dynamic range limitations of seismic signal recording systems, thereby allowing such systems to record higher quality signals across a broader range of frequencies, comprising the steps of:

determining a peak impulsive transmission frequency of the earth, detonating near the surface of the earth two or more time-spaced explosive charges in sequence, wherein the time spacing is picked in accordance with the frequency spectrum location of said earth peak transmission frequency, to de-emphasize the transmitted energy at said peak transmission frequency, so as to broaden and flatten the amplitude versus frequency spectrum of the seismic signal to be received, and detecting reflections of the received seismic signal from subsurface interfaces by means of seismometers positioned near the surface of the earth.

4. A method according to claim 3 further including the step of generating a visual record of the detected reflections.

5. A method according to claim 3 in which three charges are detonated.

6. A method according to claim 5 in which the first and third charges detonated are of the same size and the size of the second charge is selected to provide at least twice as large an impulse amplitude as said first and third charges.

7. A method according to claim 6 in which said second charge is selected to provide an impulse amplitude from two to three times as large as the impulse amplitude provided by said first and third charges.

8. A method of generating an improved seismic prospecting signal comprising:

determining a peak impulsive transmission frequency through the earth, and generating two or more time-spaced seismic initiations at essentially the same location near the surface of the earth, wherein said time spacing is picked in accordance with the frequency spectrum location of said earth peak transmission frequency to de-emphasize the transmitted energy at said peak transmission frequency so as to broaden and flatten the amplitude versus frequency spectrum of the seismic signal to be received.

9. A method according to claim 8 wherein said initiations are impulsive initiations.

10. A method according to claim 8 wherein said initiations are swept frequency vibrator initiations.

11. A method of generating an improved seismic prospecting signal, comprising the steps of:
generating two or more time-spaced seismic initiation at essentially the same location at or near the surface of the earth, wherein said time spacing is picked in accordance with the frequency spectrum location of a predetermined impulsive earth peak transmission frequency to de-emphasize the transmitted energy at said peak transmission frequency so as to broaden and flatten the amplitude versus frequency spectrum of the seismic signal to be received.

12. A method according to claim 11 wherein said seismic initiations comprise two impulses of essentially the same amplitude with a time spacing equal to the inverse of twice said predetermined earth peak transmission frequency.

13. A method according to claim 11 wherein said seismic initiations comprise three impulses with time spacings equal to the inverse of twice said predetermined earth peak transmission frequency, the amplitudes of the first and third impulses are substantially the same, and the amplitude of the second impulse is about twice that of said first and third impulses.

14. A method for seismic prospecting comprising:
determining a peak impulsive transmission frequency of seismic signals through the earth in a prospecting area,
generating a composite seismic initiation comprising three impulses, wherein the first and third impulses have about half the amplitude of the second, and wherein the time spacing of said impulses are related to said peak transmission frequency, and
receiving near the surface of the earth acoustic waves from said seismic initiation and generating a representation of subsurface interfaces from said received waves,
whereby high resolution seismic sections are obtained without the use of a correlation step.

15. A method according to claim 14 wherein:
the step of determining the peak transmission frequency comprises generating a seismic initiation comprising a single impulse near the surface of the earth in a prospecting area, receiving acoustic waves from said initiation by means of a seismometer placed near the surface of the earth, plotting the amplitude spectrum of said received acoustic waves, and selecting the frequency having the highest amplitude on said amplitude spectrum.

16. A method according to claim 14 wherein the time delays between successive impulses equal the inverse of twice said peak transmission frequency, and all three impulses are positive.

17. A method of seismic prospecting for overcoming dynamic range limitations of seismic signal recording systems, thereby allowing such systems to record higher quality signals across a broader range of frequencies, comprising the steps of:
determining a peak impulsive transmission frequency of the earth,
generating two or more time-spaced seismic initiations near the surface of the earth, wherein the time spacing is picked in accordance with the frequency spectrum location of said earth peak transmission frequency so that the combined frequency spectrum of said seismic initiation has a minimum substantially coinciding with said earth peak transmission frequency, and
recording reflections of said initiations from subsurface interface for a period of time after said initiation.

18. A method of seismic prospecting for overcoming dynamic range limitations of seismic signal recording systems, thereby allowing such systems to record higher quality signals across a broader range of frequencies, comprising the steps of:
determining a peak impulsive transmission frequency of the earth,
detonating near the surface of the earth two or more time-spaced explosive charges in sequence, wherein the time spacing is picked in accordance with the frequency spectrum location of said earth peak transmission frequency so that the combined frequency spectrum resulting from detonation of said two or more time-spaced explosive charges has a minimum substantially coinciding with said earth peak transmission frequency, and
detecting reflections of the received seismic signal from subsurface interfaces by means of seismometers positioned near the surface of the earth.

19. A method of generating an improved seismic prospecting signal comprising:
determining a peak impulsive transmission frequency through the earth, and
generating two or more time-spaced seismic initiations at essentially the same location near the surface of the earth, wherein said time spacing is picked in accordance with the frequency spectrum location of said earth peak transmission frequency so that the combined frequency spectrum of said seismic initiations has a minimum substantially coinciding with earth peak transmission frequency.

20. A method of generating an improved seismic prospecting signal, comprising:
generating two or more time-spaced seismic initiations at essentially the same location at or near the surface of the earth, wherein said time spacing is picked in accordance with the frequency spectrum location of a predetermined impulsive earth peak transmission frequency so that the combined frequency spectrum of said seismic initiations has a minimum substantially coinciding with said earth peak transmission frequency.

* * * * *